United States Patent
Kumagai et al.

(10) Patent No.: US 9,109,490 B2
(45) Date of Patent: Aug. 18, 2015

(54) ELECTRIC HEATING CATALYST

(75) Inventors: Noriaki Kumagai, Susono (JP);
Mamoru Yoshioka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 44 days.

(21) Appl. No.: 14/342,852

(22) PCT Filed: Sep. 6, 2011

(86) PCT No.: PCT/JP2011/070245
§ 371 (c)(1),
(2), (4) Date: Mar. 6, 2014

(87) PCT Pub. No.: WO2013/035156
PCT Pub. Date: Mar. 14, 2013

(65) Prior Publication Data
US 2014/0230414 A1    Aug. 21, 2014

(51) Int. Cl.
| | |
|---|---|
| B01D 50/00 | (2006.01) |
| F01N 3/20 | (2006.01) |
| F01N 9/00 | (2006.01) |
| F01N 3/28 | (2006.01) |
| B01J 35/00 | (2006.01) |

(52) U.S. Cl.
CPC ............ *F01N 3/2013* (2013.01); *F01N 3/2026* (2013.01); *F01N 3/2853* (2013.01); *F01N 3/2871* (2013.01); *F01N 9/00* (2013.01); *B01J 35/0033* (2013.01); *F01N 2240/16* (2013.01); *Y02T 10/26* (2013.01)

(58) Field of Classification Search
CPC ....... F01N 3/2026; F01N 3/2871; F01N 9/00; B01J 35/0033; Y02T 10/26
USPC ................................................. 422/174, 179
See application file for complete search history.

(56) References Cited

U.S. PATENT DOCUMENTS

| | | | | |
|---|---|---|---|---|
| 5,074,694 | A  * | 12/1991 | Nakazato et al. | 401/104 |
| 7,829,048 | B1 * | 11/2010 | Gonze et al. | 423/213.2 |
| 2014/0311134 | A1 * | 10/2014 | Yoshioka | 60/286 |

FOREIGN PATENT DOCUMENTS

| | | | |
|---|---|---|---|
| EP | 2594759 A1 | | 5/2013 |
| GB | 2425073 A | * | 10/2006 |
| JP | 5-269387 A | | 10/1993 |
| JP | 2008-14186 A | | 1/2008 |

OTHER PUBLICATIONS

International Search Report of PCT/JP2011/070245, dated Dec. 13, 2011.

* cited by examiner

*Primary Examiner* — Tom P Duong
(74) *Attorney, Agent, or Firm* — Sughrue Mion, PLLC

(57) ABSTRACT

An electric heating catalyst (EHC) in which a short circuit between a heat generation element and a case in EHC is suppressed. The EHC includes a heat generation element (catalyst carrier) electrically energized to generate heat; a case receiving the heat generation element; an insulating support member between the heat generation element and the case; a tubular inner pipe inserted into the insulating support member and located between the heat generation element and the case. The inner pipe has an end protruding into an exhaust gas from the insulating support member's end face, and the inner pipe has an electrically insulating layer formed on an entire surface, or the inner pipe is formed of an electrically insulating material; and an inner pipe heater supplied with electricity through a path different from a path through which electricity is supplied to the heat generation element, thereby heating the inner pipe's protrusion portion.

6 Claims, 8 Drawing Sheets

ELECTRIC HEATING CATALYST

CROSS REFERENCE TO RELATED APPLICATIONS

This application is a National Stage of International Application No. PCT/JP2011/070245 filed Sep. 6, 2011, the contents of all of which are incorporated herein by reference in their entirety.

TECHNICAL FIELD

The present invention relates to an electric heating catalyst that is arranged in an exhaust passage of an internal combustion engine.

BACKGROUND ART

In the past, as an exhaust gas purification catalyst arranged in an exhaust passage of an internal combustion engine, there has been developed an electric heating catalyst (hereinafter referred to as an EHC) in which a catalyst is heated by means of a heat generation element which generates heat by electrical energization thereof.

In the EHC, an insulating support member which serves to support the heat generation element and to insulate electricity is arranged between the heat generation element which generates heat by electrical energization thereof, and a case in which the heat generation element is received. For example, in Patent Document 1, there is disclosed a technique in which in an EHC, a mat of an insulating material is arranged between a carrier which is electrically energized to generate heat and a case in which the carrier is received.

In addition, in Patent Document 2, there is also disclosed a construction in which a catalytic converter having an EHC and a plasma reactor are arranged in an exhaust passage of an internal combustion engine which is mounted on a hybrid vehicle. With the construction described in Patent Document 2, a voltage is supplied to the EHC and the plasma reactor through a high voltage supply system from a battery which functions as a power supply of a motor-generator.

PRIOR ART DOCUMENTS

Patent Documents

Patent Document 1: Japanese patent application laid-open No. H05-269387
Patent Document 2: Japanese patent application laid-open No. 2008-014186

SUMMARY OF THE INVENTION

Problems to be Solved by the Invention

In the EHC, there may be provided an inner pipe in order to suppress a short circuit between the heat generation element and the case due to the condensed water which has permeated (infiltrated) into the insulating support member. The inner pipe is a tubular member which is sandwiched or clamped by the insulating support member in such a manner as to position between the heat generation element and the case. In addition, the inner pipe has an electrically insulating layer formed on the entire surface thereof, or the inner pipe is formed of an electrically insulating material.

In cases where the EHC is provided with the inner pipe, the inner pipe is formed in a manner so as to protrude from an end face of the insulating support member into an exhaust gas. By forming the inner pipe in such a manner, the inner pipe serves to suppress the condensed water, which has flowed on an inner wall surface of the case and reached the insulating support member, from reaching up to the heat generation element while transmitting through the end face of the insulating support member. Accordingly, it is possible to suppress the short circuit between the heat generation element and the case through the condensed water not only in the interior of the insulating support member but also on the end face of the insulating support member.

However, when the inner pipe is constructed in the above-mentioned manner, a particle-like material (Particulate Matter: hereinafter also referred to as PM) in the exhaust gas will adhere to a protrusion portion in the inner pipe which protrudes from the end face of the insulating support member. As a result, when the PM deposits on the protrusion portion of the inner pipe, there is a fear that the heat generation element and the case may be short-circuited with each other by the PM (particulate matter) thus deposited.

The present invention has been made in view of the problems as referred to above, and has for its object to suppress a short circuit between a heat generation element and a case in an electric heating catalyst.

Means for Solving the Problems

The present invention is to provide, in an EHC, an inner pipe heater which serves to heat a protrusion portion in an inner pipe projecting into an exhaust gas from an end face of an insulating support member.

More specifically, an electric heating catalyst according to the present invention is provided with:

a heat generation element that is electrically energized to generate heat so that a catalyst is heated by the generation of heat;

a case that receives said heat generation element therein;

an insulating support member that is arranged between said heat generation element and said case for supporting said heat generation element and insulating electricity;

an inner pipe that is a tubular member which is inserted into said insulating support member so as to be located between said heat generation element and said case, wherein said inner pipe has an end thereof protruding into an exhaust gas from an end face of said insulating support member, and said inner pipe has an electrically insulating layer formed on an entire surface thereof, or said inner pipe is formed of an electrically insulating material; and an inner pipe heater that is supplied with electricity through a path which is different from a path through which electricity is supplied to said heat generation element, thereby to heat a protrusion portion in said inner pipe which protrudes into the exhaust gas from the end face of said insulating support member.

In the present invention, it is possible to heat the protrusion portion of the inner pipe by means of the inner pipe heater, without regard to the state of supply of electricity (energization) to the heat generation element. Then, by heating the protrusion portion of the inner pipe thereby to cause its surface temperature to go up, it is possible to suppress the deposition or accumulation of particulate matter on the protrusion portion. As a result, according to the present invention, it is possible to suppress a short circuit between the heat generation element and the case through the particulate matter in the EHC.

In the present invention, the inner pipe may protrude into the exhaust gas from both upstream side and downstream side end faces of the insulating support member. In this case, when the temperature of the exhaust gas flowing into the electric heating catalyst from the upstream side thereof falls, it will be easier for the upstream side protrusion portion of the inner pipe to fall in temperature than the downstream side protrusion portion thereof. This is because the fall in the temperature of the exhaust gas flowing out of the heat generation element is suppressed by the heat capacity of the heat generation element.

Accordingly, the EHC according to the present invention may be further provided with a heater control unit that heats, among the upstream side and downstream side protrusion portions of the inner pipe, at least the upstream side protrusion portion by means of the inner pipe heater, in cases where a condition in which the temperature of the exhaust gas flowing into the electric heating catalyst from the upstream side thereof falls (hereinafter, referred to as an exhaust gas temperature fall condition) is satisfied, or in cases where the temperature of the exhaust gas becomes equal to or lower than a predetermined temperature. According to this, it is possible to suppress the deposition or accumulation of particulate matter at least on the upstream side protrusion portion of the inner pipe in which particulate matter tends to deposit or accumulate more easily.

In addition, in cases where the exhaust gas temperature fall condition is satisfied, or in cases where the temperature of the exhaust gas becomes equal to or lower than a predetermined temperature, the heater control unit may make an amount of heating to be supplied to the upstream side protrusion portion of the inner pipe by said inner pipe heater larger than an amount of heating to be supplied to the downstream side protrusion portion of said inner pipe by the inner pipe heater. According to this, the electric energy to be supplied to the inner pipe heater can be suppressed, while suppressing the deposition of particulate matter on the protrusion portions of the inner pipe.

Moreover, in cases where the exhaust gas temperature fall condition is satisfied, or in cases where the temperature of the exhaust gas becomes equal to or lower than the predetermined temperature, the heater control unit may first start heating of the upstream side protrusion portion of the inner pipe, and then start heating of the downstream side protrusion portion of the inner pipe, by means of the inner pipe heater. According to this, too, the electric energy to be supplied to the inner pipe heater can be suppressed, while suppressing the deposition of particulate matter on the protrusion portions of the inner pipe.

In the above-mentioned case, the higher the temperature of the electric heating catalyst, the longer a period of time from the start of heating of the upstream side protrusion portion of the inner pipe until the start of heating of the downstream side protrusion portion of the inner pipe may be made. According to this, the electric energy to be supplied to the inner pipe heater can be suppressed.

In the EHC according to the present invention, an end face of the insulating support member between the case and the inner pipe may be dented from the end face of the heat generation element. In this case, an amount of dent of the end face of the insulating support member is larger than a spatial distance between the case and the inner pipe.

According to this, a creepage distance for insulation between the heat generation element and the case can be made longer. In addition, the lengths (amounts of protrusion) of the protrusion portions of the inner pipe can be shortened, while ensuring the creepage distance for insulation between the heat generation element and the case, so it becomes possible to make smaller the size of the EHC as a whole.

Further, it is easy for particulate matter to deposit on the end face of the insulating support member between the case and the inner pipe. On the other hand, the inner pipe in those portions in which the insulating support member is dented or retreated inward is easier to be heated by the heat conduction from the catalyst carrier than the protrusion portions. For that reason, it is difficult for particulate matter to adhere to the outer peripheral surface of the inner pipe in those portions. Accordingly, by making the amount of dent in the end face of the insulating support member between the case and the inner pipe larger than the spatial distance between the case and the inner pipe, it is possible to ensure the creepage distance for insulation equal to or greater than a creepage distance along the end face of the insulating support member between the case and the inner pipe, even if the end face of the insulating support member between the case and the inner pipe is covered with particulate matter.

Advantageous Effect of the Invention

According to the present invention, it is possible to suppress a short circuit between the heat generation element and the case through the particulate matter in the EHC.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Schematic Construction of an EHC

Figure 1:
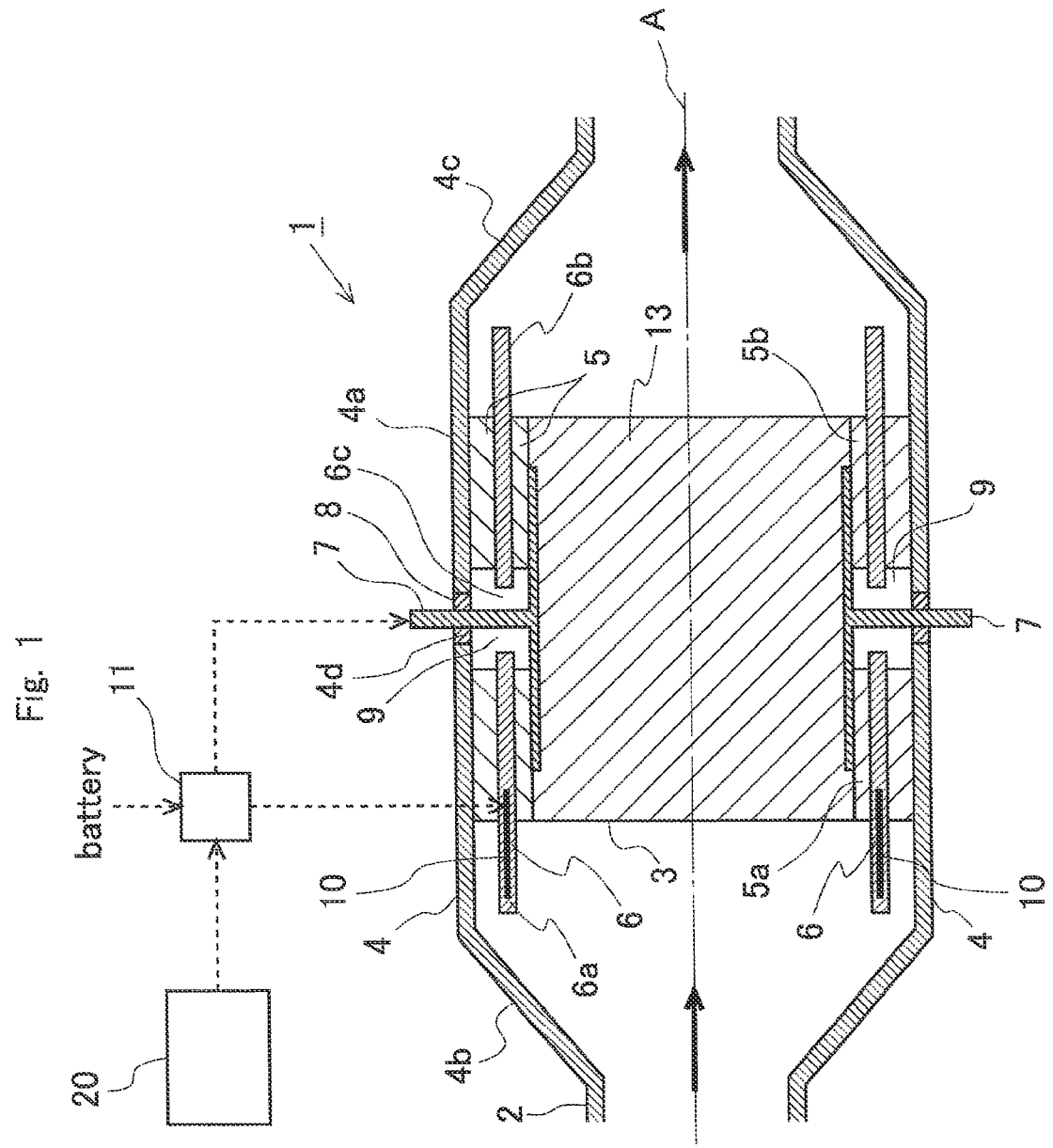
FIG. 1 is a view showing the schematic construction of an EHC according to a first embodiment.

FIG. 1 is a view showing the schematic construction of an EHC according to this first embodiment. FIG. 1 is a cross sectional view showing the EHC cut along a central axis thereof.

The EHC 1 according to this embodiment is arranged in an exhaust pipe of an internal combustion engine mounted on a vehicle. The internal combustion engine may be a diesel engine or may be a gasoline engine. In addition, the EHC 1 according to this embodiment can also be used in a vehicle which adopts a hybrid system equipped with an electric motor. Here, note that an arrow in FIG. 1 shows the direction of the flow of an exhaust gas in the exhaust pipe.

The EHC 1 according to this embodiment is provided with a catalyst carrier 3, a case 4, a mat 5, an inner pipe 6, and electrodes 7. The catalyst carrier 3 is formed in the shape of a circular cylinder, and is arranged in such a manner that a central axis thereof is in alignment with a central axis A of the exhaust pipe 2. An exhaust gas purification catalyst 13 is carried or supported by the catalyst carrier 3. As the exhaust gas purification catalyst 13, there can be mentioned, by way of example, an oxidation catalyst, an NOx storage reduction catalyst, an NOx selective reduction catalyst, a three-way catalyst, and so on.

The catalyst carrier 3 is formed of a material which, when electrically energized, becomes an electric resistance to generate heat. As a material for the catalyst carrier 3, there can be mentioned SiC by way of example. The catalyst carrier 3 has a plurality of passages which extend in a direction in which an exhaust gas flows (i.e., the direction of the central axis A), and which have a cross section of honeycomb shape vertical to the direction in which the exhaust gas flows. The exhaust gas flows through these passages. Here, note that the cross sectional shape of the catalyst carrier 3 in the direction orthogonal to the central axis A may be elliptical, etc. The central axis A is a central axis common to the exhaust pipe 2, the catalyst carrier 3, the inner pipe 6, and the case 4.

The catalyst carrier 3 is received in the case 4. An electrode chamber 9 is formed in the case 4. Here, note that the details of the electrode chamber 9 will be described later. One pair of electrodes 7 are connected to the catalyst carrier 3 through the electrode chamber 9 in a left and right (horizontal) direction. Electricity is supplied to the electrodes 7 from a battery through an electric supply control unit 11. When electricity is supplied to the electrodes 7, the catalyst carrier 3 is electrically energized. When the catalyst carrier 3 generates heat by energization thereof, the exhaust gas purification catalyst 13 supported by the catalyst carrier 3 is heated, so that the activation thereof is facilitated.

The case 4 is formed of metal. As a material which forms the case 4, there can be mentioned a stainless steel material by way of example. The case 4 has a receiving portion 4a which is constructed to include a curved surface parallel to the central axis A, and tapered portions 4b, 4c which serve to connect the receiving portion 4a and the exhaust pipe 2 with each other at the upstream side and the downstream side, respectively, of the receiving portion 4a. The receiving portion 4a has a channel cross section which is larger than that of the exhaust pipe 2, and the catalyst carrier 3, the mat 5 and the inner pipe 6 are received in the inside of the receiving portion 4a. The tapered portions 4b, 4c each take a tapered shape of which the channel cross section decreases in accordance with the increasing distance thereof from the receiving portion 4a.

The mat 5 is inserted between an inner wall surface of the receiving portion 4a of the case 4, and an outer peripheral surface of the catalyst carrier 3. In other words, inside the case 4, the catalyst carrier 3 is supported by the mat 5. In addition, the inner pipe 6 is inserted in the mat 5. The inner pipe 6 is a tubular shape with the central axis A being located as a center thereof. The mat 5 is arranged to sandwich or clamp the inner pipe 6 therein, whereby it is divided into a portion at the side of the case 4 and a portion at the side of the catalyst carrier 3 by means of the inner pipe 6.

The mat 5 is formed of an electrically insulating material. As a material which forms the mat 5, there can be mentioned, by way of example, a ceramic fiber which includes alumina as a main component. The mat 5 is wound around the outer peripheral surface of the catalyst carrier 3 and the outer peripheral surface of the inner pipe 6. In addition, the mat 5 is divided into an upstream side portion 5a and a downstream side portion 5b, with a space being formed between the upstream side portion 5a and the downstream side portion 5b. Due to the insertion of the mat 5 between the catalyst carrier 3 and the case 4, it is possible to suppress electricity from flowing to the case 4 at the time when the catalyst carrier 3 is electrically energized.

The inner pipe 6 is formed of a stainless steel material. In addition, an electrically insulating layer is formed on the entire surface of the inner pipe 6. As a material which forms the electrically insulating layer, ceramic or glass can be mentioned by way of example. Here, note that the main body of the inner pipe 6 may be formed of an electrically insulating material such as alumina or the like.

In addition, as shown in FIG. 1, the inner pipe 6 has a length in the direction of the central axis A longer than that of the mat 5. As a result, the inner pipe 6 has an upstream side end and a downstream side end thereof protruding from an upstream side end face and a downstream side end face of the mat 5, respectively. In the following, those portions 6a, 6b of the inner pipe 6 which protrude from the end faces of the mat 5 into the exhaust gas are referred to as "protrusion portions".

The case 4 and the inner pipe 6 have through holes 4d, 6c opened therein, respectively, so as to allow the electrodes 7 to pass through them. Then, the electrode chamber 9 is formed by a space between the upstream side portion 5a and the downstream side portion 5b of the mat 5 in the case 4. In other words, in this embodiment, the electrode chamber 9 is formed over the entire circumference of the outer peripheral surface of the catalyst carrier 3 between the upstream side portion 5a and the downstream side portion 5b of the mat 5. Here, note that a space, which becomes the electrode chamber, may be formed by forming through holes only in those portions of the mat 5 through which the electrodes 7 pass, without dividing the mat 5 into the upstream side portion 5a and the downstream side portion 5b.

Electrode support members 8, which serve to support the electrodes 7, respectively, are arranged in the through holes 4d which are opened in the case 4. These electrode support members 8 are each formed of an electrically insulating material, and are fitted with no gap between the case 4 and the electrodes 7.

Moreover, an inner pipe heater 10 is embedded in the interior of the upstream side protrusion portion 6a and its vicinity in the inner pipe 6. The inner pipe heater 10 is an electric heater for heating the upstream side protrusion portion 6a of the inner pipe 6. The inner pipe heater 10 is operated by being supplied with electricity from the battery through the electric supply control unit 11. Here, note that the inner pipe heater 10 may be formed in such a manner as to be inserted or sandwiched between the inner pipe 6 and the mat 5, or may be embedded in the mat 5. Even in cases where the inner pipe heater 10 is arranged at the side of the mat 5, when the inner pipe heater 10 is caused to operate, the upstream side protrusion portion 6a of the inner pipe 6 can be heated by heat conduction.

The electric supply control unit 11 serves to switch on and off the supply of electricity to the electrodes 7 and the inner pipe heater 10 as well as to adjust the amounts of electricity to be applied thereto, respectively. The electric supply control unit 11 is electrically connected to an electronic control unit (ECU) 20 which is provided in combination with the internal combustion engine 1. The electric supply control unit 11 is controlled by the ECU 20.

In this embodiment, it is possible to supply electricity to the inner pipe heater 10 through the electric supply control unit 11, in a path different from an electric supply path to the electrodes 7. As a result, it is possible to heat the upstream side protrusion portion 6a in the inner pipe 6 by means of the inner pipe heater 10, without regard to the state of supply of electricity to the electrodes 7, i.e., the state of supply of electricity (energization) to the catalyst carrier 3.

In addition, in the exhaust pipe 2 or in the case 4 of the EHC 1, condensed water is generated due to condensation of the moisture in the exhaust gas at the time of cold start of the internal combustion engine or the like. When the condensed water generated in the exhaust pipe 2 or in the case 4 flows along the inner wall surface of the case 4 and reaches up to the mat 5, the condensed water may permeate (infiltrate) into the mat 5. Also, the moisture, which has permeated into the mat 5 in the state of water vapor, may condense inside the mat 5.

Accordingly, in the EHC 1 according to this embodiment, the inner pipe 6, of which the entire surface is covered with the electrically insulating layer, is inserted into the mat 5. Due to such an arrangement, it is possible to suppress the catalyst carrier 3 and the case 4 from being short-circuited to each other by means of the condensed water inside the mat 5. In addition, by means of the protrusion portions 6a, 6b of the inner pipe 6, it is possible to suppress the condensed water from reaching up to the catalyst carrier 3 while transmitting through the end faces of the mat 5. Accordingly, it is possible to suppress the short circuit between the catalyst carrier 3 and the case 4 through the condensed water on the end faces of the mat 5.

Here, note that in this embodiment, the inner pipe 6 need not necessarily protrude from both the upstream side and the downstream side of the mat 5. For example, the construction may also be such that a protrusion portion of the inner pipe 6 is formed only at the upstream side of the mat at which an amount of generation of condensed water is more than that at the downstream side thereof.

In this embodiment, the catalyst carrier 3 corresponds to a heat generation element according to the present invention. However, the heat generation element according to the present invention is not limited to a carrier which supports a catalyst, but instead the heat generation element may be a structure which is arranged at the upstream side of a catalyst, for example. In addition, in this embodiment, the case 4 corresponds to a case according to the present invention, the mat 5 corresponds to an insulating support member according to the present invention, and the inner pipe 6 corresponds to an inner pipe according to the present invention. Also, in this embodiment, the inner pipe heater 10 corresponds to an inner pipe heater according to the present invention.

[Control of the Inner Pipe Heater]

Here, when the inner pipe 6 is constructed as mentioned above, particulate matter (PM) in the exhaust gas may adhere to the protrusion portions 6a, 6b of the inner pipe 6. When the temperatures of the protrusion portions 6a, 6b of the inner pipe 6 are high, the particulate matter adhered to these portions will be oxidized and removed. However, when the temperatures of the protrusion portions 6a, 6b of the inner pipe 6 are low, the particulate matter adhered to these portions will gradually deposit or accumulate. The particulate matter has electric conductivity. As a result, when the particulate matter deposits over the end faces of the mat 5 and the entire surface of the protrusion portion 6a (or 6b) of the inner pipe 6, there occurs a short circuit between the catalyst carrier 3 and the case 4 through the particulate matter thus deposited.

In particular, in cases where the temperature of the exhaust gas exhausted from the internal combustion engine has become low (i.e., in cases where the temperature of the exhaust gas flowing into the EHC 1 has become low), the temperature of the upstream side protrusion portion 6a of the inner pipe 6 is easier to fall in comparison with the downstream side protrusion portion 6b of the inner pipe 6. This is because even if the temperature of the exhaust gas flowing into the EHC 1 has become low, the fall in the temperature of the exhaust gas flowing out of the catalyst carrier 3 is suppressed by the heat capacity of the catalyst carrier 3, as a result of which the fall in the temperature of the downstream side protrusion portion 6b of the inner pipe 6 is also suppressed.

For that reason, it is easier for particulate matter to deposit on the upstream side protrusion portion 6a of the inner pipe 6, in comparison with on the downstream side protrusion portion 6b of the inner pipe 6. Accordingly, in this embodiment, by heating the upstream side protrusion portion 6a of the inner pipe 6 by means of the inner pipe heater 10 thereby to cause its surface temperature to go up, it is possible to suppress the deposition or accumulation of particulate matter on the upstream side protrusion portion 6a.

Figure 2:
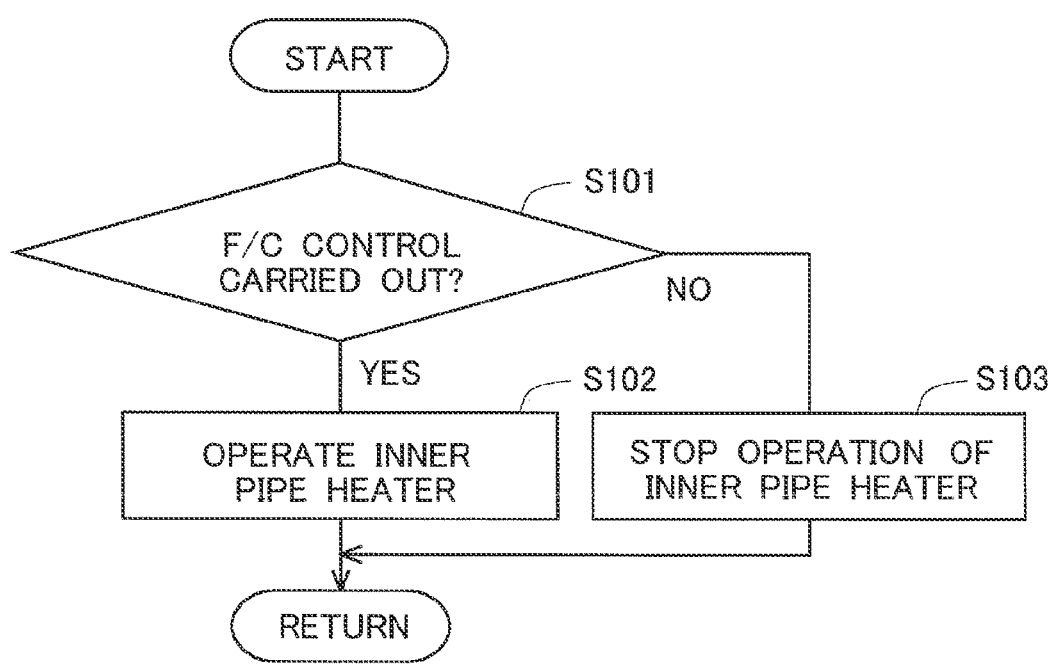
FIG. 2 is a flow chart showing a flow of control of an inner pipe heater according to the first embodiment.

Hereinafter, reference will be made to a flow of control of the inner pipe heater according to this embodiment based on a flow chart shown in FIG. 2. This flow has been beforehand stored in the ECU 20, and is executed by the ECU 20 in a repeated manner.

In this flow, first, in step S101, it is determined whether so-called fuel cut-off control (F/C control) in which fuel injection in the internal combustion engine is stopped has been carried out. In cases where a determination is made in step S101 that the fuel cut-off control has been carried out, then in step S102, the inner pipe heater 10 is operated. In other words, electricity is supplied to the inner pipe heater 10 from the battery through the electric supply control unit 11. On the other hand, in cases where a determination is made in step S101 that the fuel cut-off control has not been carried out, then in step S103, the operation of the inner pipe heater 10 is stopped. In other words, the supply of electricity to the inner pipe heater 10 is stopped.

When the fuel cut-off control is carried out in the internal combustion engine, the temperature of the exhaust gas falls to a large extent. In this case, in the above-mentioned flow, the inner pipe heater 10 is operated. In other words, when the fuel cut-off control is carried out, the upstream side protrusion portion 6a of the inner pipe 6 is heated by the inner pipe heater 10. As a result of this, the temperature of the upstream side protrusion portion 6a is suppressed from falling. For that reason, it is possible to suppress the deposition of particulate matter on the upstream side protrusion portion 6a. As a result, it is possible to suppress a short circuit between the catalyst carrier 3 and the case 4 by the particulate matter.

Here, note that in the above-mentioned flow, "the fuel cut-off control having been carried out in the internal combustion engine" corresponds to "an exhaust gas temperature fall condition" in the present invention. However, "the exhaust gas temperature fall condition" in the present invention is not limited to this. For example, "the exhaust gas temperature fall condition" in the present invention may instead be "an engine load of the internal combustion engine having been reduced to a predetermined value or below".

In addition, in this embodiment, the temperature of the exhaust gas flowing into the EHC 1 may be detected by a sensor, etc., or may be estimated based on an operating state of the internal combustion engine. Then, when the temperature of the exhaust gas flowing into the EHC 1 thus detected or estimated is equal to or lower than the predetermined temperature, you may operate the inner pipe heater 10 may be caused to operate. In this case, when the temperature of the exhaust gas is higher than the predetermined temperature, the operation of the inner pipe heater 10 is caused to stop. The predetermined temperature here is one at which a judgment can be made that a larger amount of particulate matter than an allowable amount may deposit on the upstream side protrusion portion 6a of the inner pipe 6. The predetermined temperature can be beforehand determined based on experiments, etc.

Second Embodiment

Schematic Construction of an EHC

Figure 3:
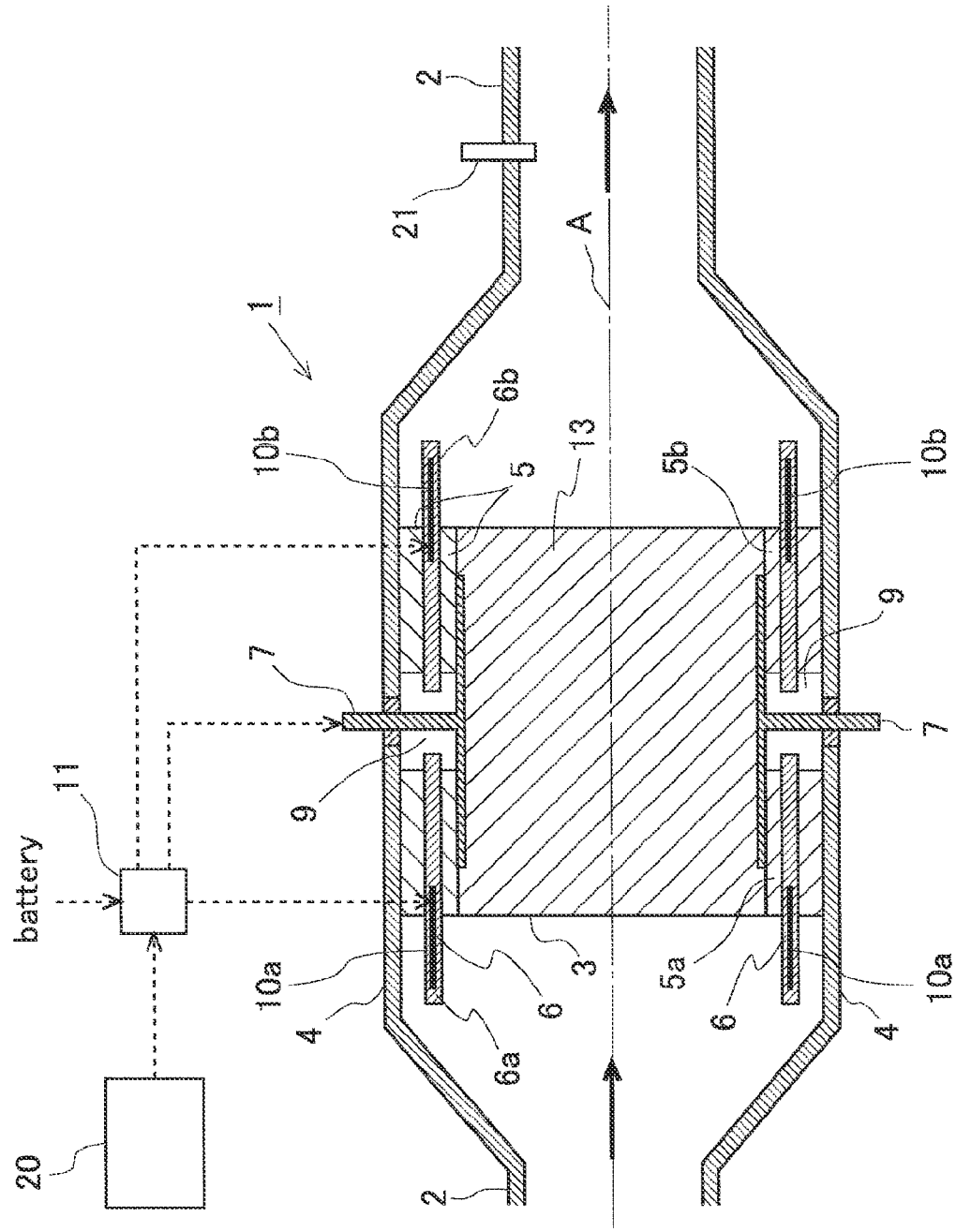
FIG. 3 is a view showing the schematic construction of an EHC according to a second embodiment.

FIG. 3 is a view showing the schematic construction of an EHC according to this second embodiment. In the following, what is different from the EHC according to the first embodiment will be mainly explained. In this embodiment, an inner pipe heater, which is embedded in the interior of an upstream side protrusion portion 6a and its vicinity in an inner pipe 6 in order to heat the upstream side protrusion portion 6a of the inner pipe 6, is referred to as an upstream side inner pipe heater 10a. In addition, in this embodiment, in addition to the upstream side inner pipe heater 10a, a downstream side inner pipe heater 10b is embedded in the interior of a downstream side protrusion portion 6b and its vicinity in the inner pipe 6. The downstream side inner pipe heater 10b is an electric heater for heating the downstream side protrusion portion 6b of the inner pipe 6.

The upstream side and downstream side inner pipe heaters 10a, 10b are respectively operated by being supplied with electricity from a battery through an electric supply control unit 11. Here, note that the downstream side inner pipe heater 10b may be formed in such a manner as to be inserted or sandwiched between the inner pipe 6 and the mat 5, similarly to the upstream side inner pipe heater 10a, or may be embedded in the mat 5. Even in cases where the downstream side inner pipe heater 10b is arranged at the side of the mat 5, when the downstream side inner pipe heater 10b is caused to operate, the downstream side protrusion portion 6b of the inner pipe 6 can be heated by heat conduction.

Moreover, in the present invention, a temperature sensor 21 is arranged in an exhaust pipe 2 at the downstream side of the EHC 1. The temperature sensor 21 serves to detect the temperature of the exhaust gas discharged from the EHC 1. The temperature sensor 21 is electrically connected to an ECU 20. A detection value of the temperature sensor 21 is inputted to the ECU 20.

[Control of the Inner Pipe Heater]

In this embodiment, in cases where the temperature of the exhaust gas discharged from the internal combustion engine has fallen, not only the upstream side protrusion portion 6a of the inner pipe 6 is heated by the upstream side inner pipe heater 10a, but also the downstream side protrusion portion 6b of the inner pipe 6 is heated by the downstream side inner pipe heater 10b. As a result of this, it is possible to suppress not only the deposition of particulate matter on the upstream side protrusion portion 6a, but also the deposition of particulate matter on the downstream side protrusion portion 6b. Accordingly, it is possible to suppress a short circuit between the catalyst carrier 3 and the case 4 by the particulate matter at a higher probability.

However, as stated above, particulate matter is more difficult to deposit on the downstream side protrusion portion 6b of the inner pipe 6 in comparison with on the upstream side protrusion portion 6a. Accordingly, in this embodiment, when the individual inner pipe heaters 10a, 10b are caused to operate, the amount of heating to be supplied to the upstream side protrusion portion 6a of the inner pipe 6 by the upstream side inner pipe heater 10a is made larger than the amount of heating to be supplied to the downstream side protrusion portion 6b of the inner pipe 6 by the downstream side inner pipe heater 10b. In other words, the amount of electricity (energization) to be supplied to the upstream side inner pipe heater 10a is made larger than the amount of electricity to be supplied to the downstream side inner pipe heater 10b. Stated in another way, the amount of electricity to be supplied to the downstream side inner pipe heater 10b is made smaller than the amount of electricity to be applied to the upstream side inner pipe heater 10a.

Even if the amounts of electricity to be applied to the individual inner pipe heaters 10a, 10b are controlled as mentioned above, it is possible to suppress the deposition of particulate matter on the downstream side protrusion portion 6b of the inner pipe 6 to a sufficient extent. Accordingly, it is possible to suppress a short circuit between the catalyst carrier 3 and the case 4 by the particulate matter. Then, by controlling the amounts of electricity to be applied to the individual inner pipe heaters 10a, 10b in the above-mentioned manner, it is possible to suppress or reduce the electric energy to be supplied to the individual inner pipe heaters 10a, 10b.

Figure 4:
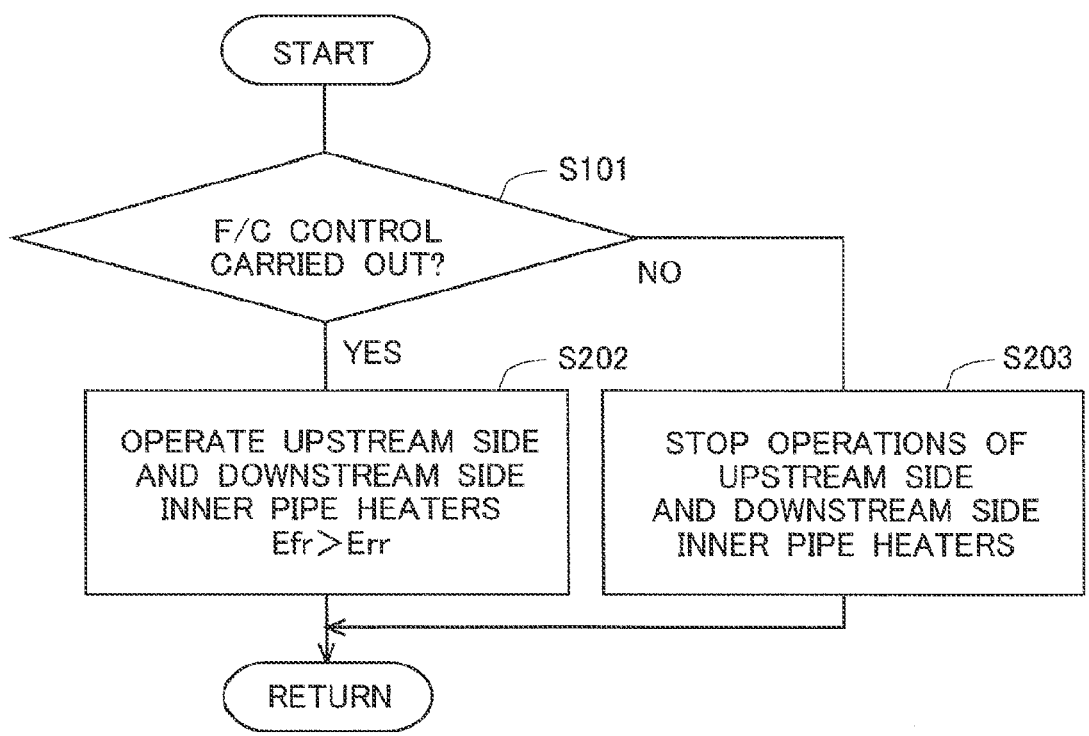
FIG. 4 is a flow chart showing a flow of control of an inner pipe heater according to the second embodiment.

Hereinafter, reference will be made to a flow of control of the inner pipe heater according to this embodiment based on a flow chart shown in FIG. 4. This flow has been beforehand stored in the ECU 20, and is executed by the ECU 20 in a repeated manner. Here, note that step S101 in this flow is the same as the step S101 in the flow shown in FIG. 2, and hence the explanation thereof is omitted.

In this flow, in cases where a determination is made in step S101 that fuel cut-off control has been carried out, then in step S202, the upstream side and downstream side inner pipe heaters 10a, 10b are operated. In other words, electricity is supplied to the upstream side and downstream side inner pipe heaters 10a, 10b from the battery through the electric supply control unit 11. In other words, the amount of electricity Efr to be supplied to the upstream side inner pipe heater 10a is caused to be larger than the amount of electricity Err to be supplied to the downstream side inner pipe heater 10b by means of the electric supply control unit 11.

On the other hand, in cases where a determination is made in step S101 that the fuel cut-off control has not been carried out, then in step S203, the operations of the upstream side and downstream side inner pipe heaters 10a, 10b are stopped. In other words, the supply of electricity to the upstream side and downstream side inner pipe heaters 10a, 10b is stopped.

According to the above-mentioned flow, when the fuel cut-off control in the internal combustion engine is carried out, the upstream side and downstream side protrusion portions 6a, 6b of the inner pipe 6 are heated. Then, the amount of heating to the upstream side protrusion portion 6a at this time becomes larger than the amount of heating to the downstream side protrusion portion 6b.

[Modification]

In the following, reference will be made to the control of the inner pipe heater according to a modification of the second embodiment. In this modification, too, in cases where the temperature of the exhaust gas discharged from the internal combustion engine has fallen, the upstream side protrusion portion 6a of the inner pipe 6 is heated by the upstream side inner pipe heater 10a, and the downstream side protrusion portion 6b of the inner pipe 6 is heated by the downstream side inner pipe heater 10b. At this time, the amount of electricity to be supplied to the upstream side inner pipe heater 10a is made equal to the amount of electricity to be supplied to the downstream side inner pipe heater 10b.

However, in this modification, the heating of the upstream side protrusion portion 6a of the inner pipe 6 by the upstream side inner pipe heater 10a is first started, and thereafter, the heating of the downstream side protrusion portion 6b of the inner pipe 6 by the downstream side inner pipe heater 10b is started. In other words, when the individual inner pipe heaters 10a, 10b are caused to operate, electrical energization (supply of electric power) to the upstream side inner pipe heater 10a is first started. Then, after a certain amount of delay time has elapsed from the start of electrical energization to the upstream side inner pipe heater 10a, electrical energization to the downstream side inner pipe heater 10b is started.

As stated above, particulate matter is more difficult to deposit on the downstream side protrusion portion 6b of the inner pipe 6 in comparison with on the upstream side protrusion portion 6a. For that reason, as in this modification, even if the start of heating to the downstream side protrusion portion 6b of the inner pipe 6 is delayed from the start of heating to the upstream side protrusion portion 6a of the inner pipe 6, the deposition of particulate matter on the downstream side protrusion portion 6b of the inner pipe 6 can be suppressed to a sufficient extent. Accordingly, it is possible to suppress a short circuit between the catalyst carrier 3 and the case 4 by the particulate matter. Then, by controlling the timings of the starts of electrical energization to the individual inner pipe heaters 10a, 10b in the above-mentioned manner, it is possible to suppress or reduce the electric energy to be supplied to the individual inner pipe heaters 10a, 10b. In other words, the same effects can be obtained as in the case where the amount of electricity to be supplied to the downstream side inner pipe heater 10b is made smaller than the amount of electricity to be applied to the upstream side inner pipe heater 10a, as mentioned above.

Figure 5:
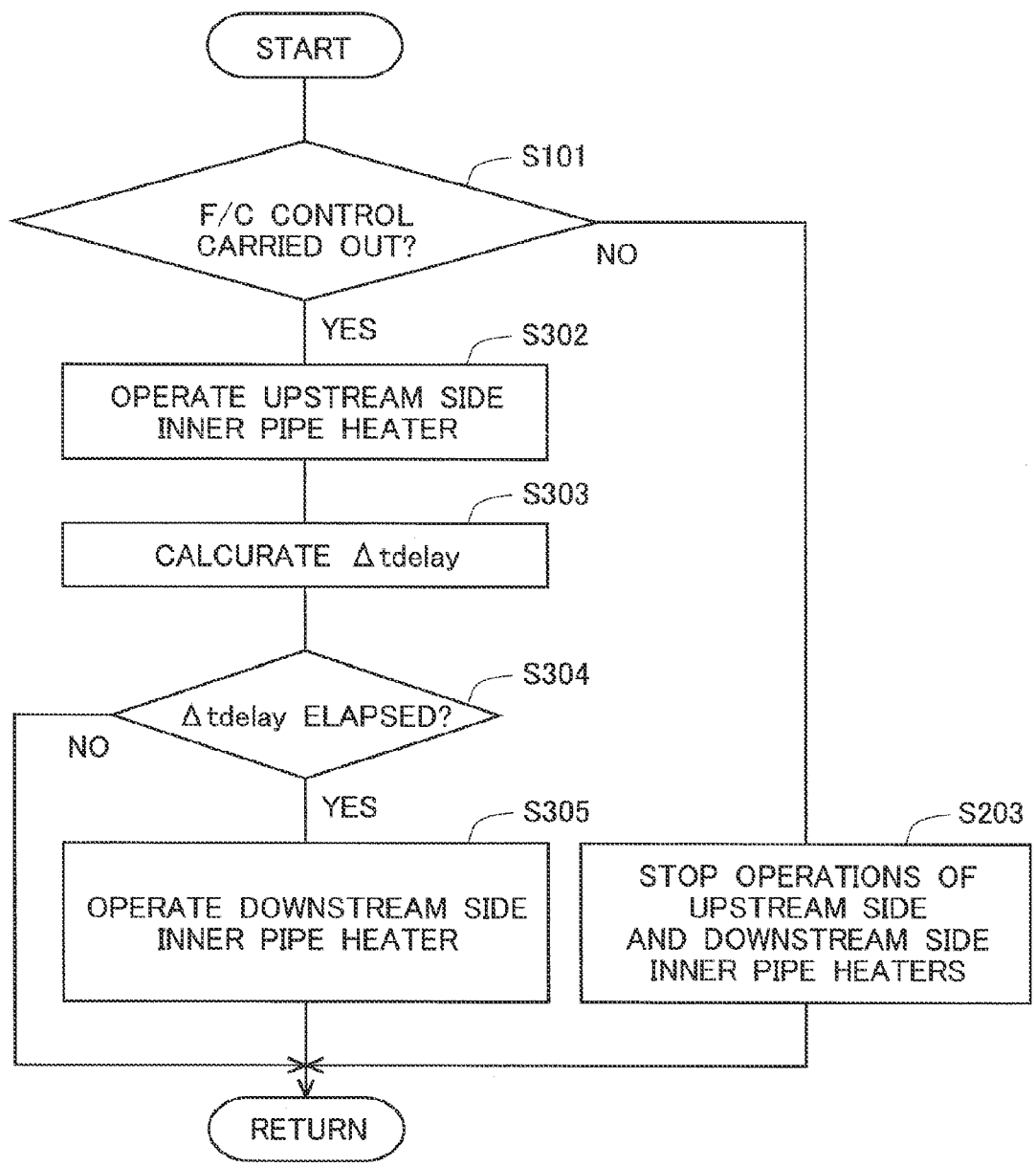
FIG. 5 is a flow chart showing a flow of control of an inner pipe heater according to a modification of the second embodiment.

Hereinafter, reference will be made to a flow of control of the inner pipe heater according to this modification based on a flow chart shown in FIG. 5. This flow has been beforehand stored in the ECU 20, and is executed by the ECU 20 in a repeated manner. Here, note that step S101 in this flow is the same as the step S101 in the flow shown in FIG. 2. Also, step S203 in this flow is the same as the step S203 in the flow shown in FIG. 4. For that reason, the explanation of the processing of these steps is omitted.

In this flow, in cases where a determination is made in step S101 that fuel cut-off control has been carried out, then in step S302, the upstream side inner pipe heater 10a is operated. In other words, electricity is supplied to the upstream side inner pipe heater 10a from the battery through the electric supply control unit 11.

Figure 6:
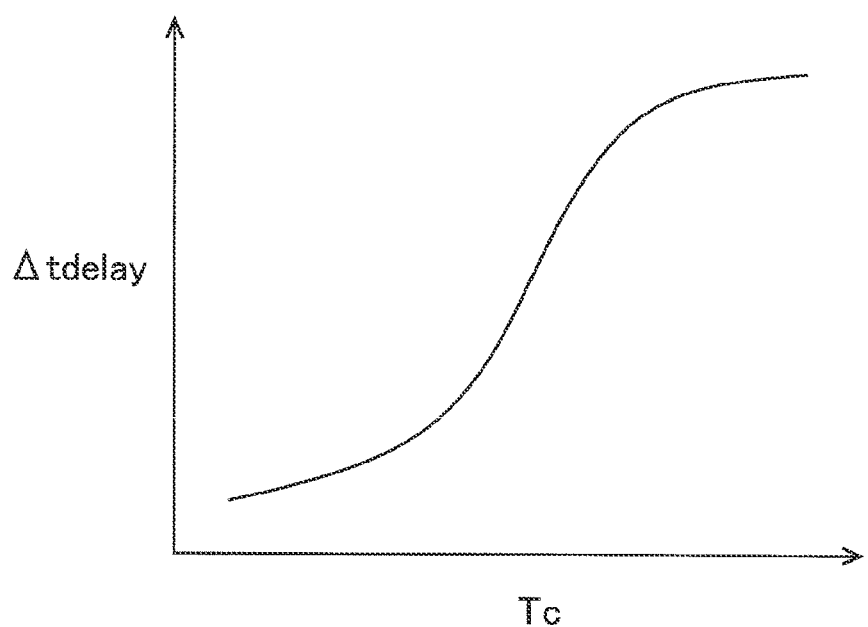
FIG. 6 is a view showing the relation between a temperature Tc of the EHC and a delay time Δ tdelay according to the second embodiment.

Then, in step S303, a predetermined delay time Δ tdelay is calculated based on a temperature Tc of the EHC 1. FIG. 6 is a view showing the relation between the temperature Tc of the EHC 1 and the delay time Δ tdelay. The higher the temperature Tc of the EHC 1, the more difficult it is for the temperature of the downstream side protrusion portion 6b of the inner pipe 6 to fall. In other words, it is difficult for particulate matter to deposit on the downstream side protrusion portion 6b of the inner pipe 6. For that reason, the higher the temperature Tc of the EHC 1, the longer the delay time Δ tdelay can be made (i.e., the more the timing of the start of energization to the downstream side inner pipe heater 10b can be delayed), as shown in FIG. 6.

In this embodiment, the relation between the temperature Tc of the EHC 1 and the delay time Δ tdelay as shown in FIG. 6 is stored in the ECU 20 in advance as a map or a function. In step S303, the delay time Δ tdelay is calculated by using the map or the function. Here, note that the temperature Tc of the EHC 1 is estimated by the ECU 20 based on the detected value of the temperature sensor 21. In addition, as shown in FIG. 6, the delay time tdelay may not change in a continuous manner with respect to the temperature Tc of the EHC 1, but may change in a stepwise manner with respect to the temperature Tc of the EHC 1.

Then, in step S304, it is determined whether the delay time Δ tdelay calculated in step S303 has elapsed after the operation of the upstream side inner pipe heater 10a was started. In cases where a determination is made in step S304 that the delay time Δ tdelay has elapsed after the operation of the upstream side inner pipe heater 10a was started, then in step S305, the downstream side inner pipe heater 10b is operated. In other words, electricity is supplied to the downstream side inner pipe heater 10b from the battery through the electric supply control unit 11. On the other hand, in cases where a determination is made in step S304 that the delay time Δ tdelay has not elapsed after the operation of the upstream side inner pipe heater 10a was started, only the operation of the upstream side inner pipe heater 10a is continued. However, when the execution of the fuel cut-off control in the internal combustion engine has been ended at this time, the operation of the upstream side inner pipe heater 10a is also stopped.

According to the above-mentioned flow, when fuel cut-off control in the internal combustion engine is carried out, the heating of the upstream side protrusion portion 6a of the inner pipe 6 by the upstream side inner pipe heater 10a is first started, and thereafter, when the delay time Δ tdelay has elapsed, the heating of the downstream side protrusion portion 6b of the inner pipe 6 by the downstream side inner pipe heater 10b is started.

In addition, according to the above-mentioned flow, the delay time Δ tdelay is made longer in accordance with the higher temperature of the EHC 1. Here, note that the delay time Δ tdelay may also be a fixed period of time which has been set in advance. However, by changing the delay time Δ tdelay in the above-mentioned manner, it is possible to suppress the electric energy to be supplied to the downstream side inner pipe heater 10b as much as possible.

Third Embodiment

Schematic Construction of an EHC

Figure 7:
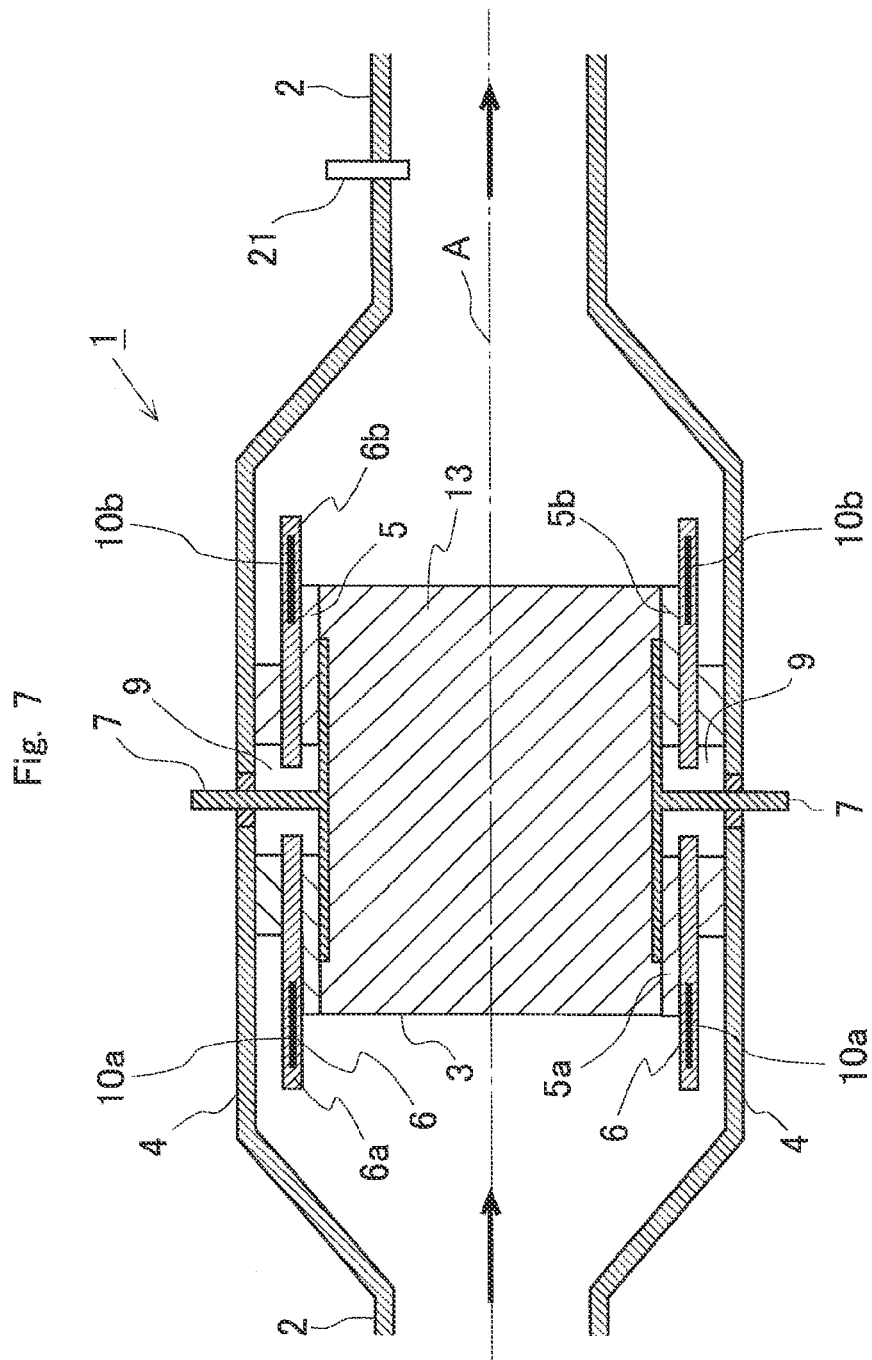
FIG. 7 is a view showing the schematic construction of an EHC according to a third embodiment.

FIG. 7 is a view showing the schematic construction of an EHC according to this third embodiment. In the following, what is different from the EHC according to the second embodiment will be mainly explained.

Figure 8:
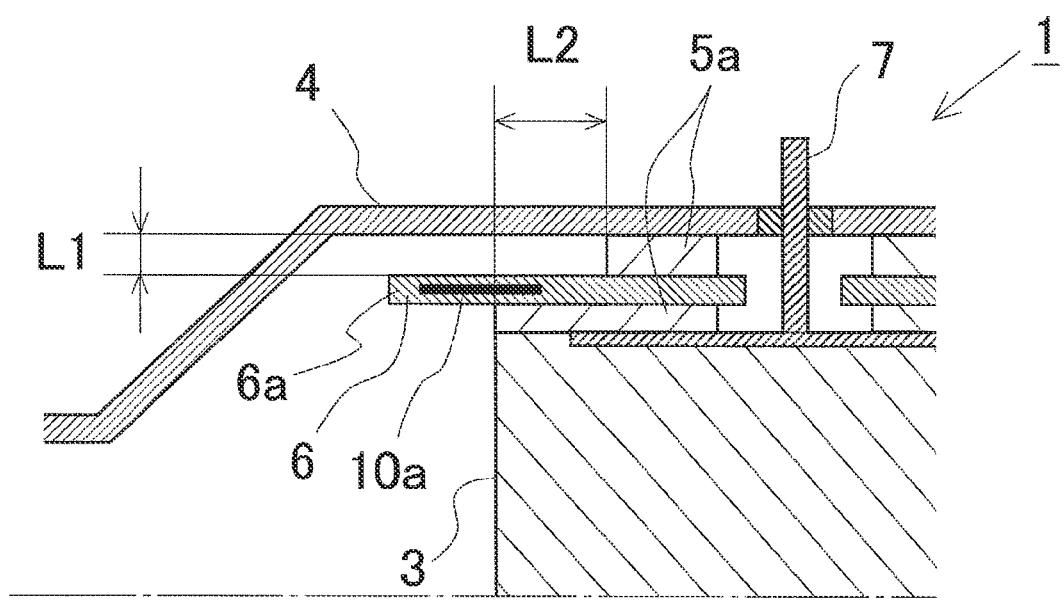
FIG. 8 is an enlarged view in which a vicinity of an upstream side portion of a mat in the EHC according to the third embodiment.

FIG. 8 is an enlarged view in which a vicinity of an upstream side portion 5a of a mat 5 in an EHC 1 (a surrounding of an upper part of the upstream side portion 5a of the mat 5 in FIG. 7) is enlarged. Here, note that a downstream side portion 5b of the mat 5 also has the same construction as that of the upstream side portion 5a. Hereinafter, the upstream side portion 5a of the mat 5 is referred to as "an upstream side mat 5a", and the downstream side portion 5b of the mat 5 is referred to as "a downstream side mat 5b".

As mentioned above, an inner pipe 6 is inserted in the mat 5. For that reason, the upstream side mat 5a and the downstream side mat 5b are each divided into a portion located between a case 4 and the inner pipe 6, and a portion located between the inner pipe 6 and a catalyst carrier 3. Then, in this embodiment, as shown in FIGS. 7 and 8, an end face (an upstream side end face) of the upstream side mat 5a between the case 4 and the inner pipe 6 and an end face (a downstream side end face) of the downstream side mat 5b between the case 4 and the inner pipe 6 are dented or retreated inward (i.e., to a center side in an axial direction in the EHC 1) from the end faces of the catalyst carrier 3, respectively.

Then, as shown in FIG. 8, an amount of dent or retreat L2 (i.e., a distance from an upstream side end face of the catalyst carrier 3 to the upstream side end face of the upstream side mat 5a between the case 4 and the inner pipe 6 and a distance from a downstream side end face of the catalyst carrier 3 to the downstream side end face of the downstream side mat 5b between the case 4 and the inner pipe 6) is larger than a clearance or spatial distance L1 between the case 4 and the inner pipe 6.

Here, note that in this embodiment, too, the upstream side and downstream side mats 5a, 5b between the inner pipe 6 and the catalyst carrier 3 extend to the vicinities of the end faces of the catalyst carrier 3, respectively, similar to the first and second embodiments.

According to the construction as mentioned above, it is possible to make a creepage distance for insulation between the catalyst carrier 3 and the case 4 longer in comparison with the case where the upstream side and downstream side mats 5a, 5b between the case 4 and the inner pipe 6 extend to the vicinities of the end faces of the catalyst carrier 3, respectively, similar to the first and second embodiments. In addition, the lengths (the amounts of protrusion) of the protrusion portions 6a, 6b of the inner pipe 6 can be shortened, while ensuring the creepage distance for insulation between the catalyst carrier 3 and the case 4, so it becomes possible to make smaller the size of the EHC 1 as a whole.

In addition, it is easy for particulate matter to deposit on the end faces of the upstream side and downstream side mats 5a, 5b between the case 4 and the inner pipe 6. On the other hand, with the construction as stated above, in those portions in which the end faces of the upstream side mat 5a and the downstream side mat 5b are dented or retreated inward, the outer peripheral surface of the inner pipe 6 is exposed to the exhaust gas. For that reason, there is a fear that particulate matter may also adhere to the outer peripheral surface of the inner pipe 6 in those portions. However, the inner pipe 6 in those portions is easier to be heated by the heat conduction from the catalyst carrier 3 than the protrusion portions 6a, 6b. In other words, the temperature of those portions in the inner pipe 6 is difficult to fall. For that reason, it is difficult for particulate matter to deposit on the outer peripheral surface of the inner pipe 6.

Accordingly, by making the amount of dent L2 in the end faces of the upstream side and downstream side mats 5a, 5b between the case 4 and the inner pipe 6 larger than the spatial distance L1 between the case 4 and the inner pipe 6, it is possible to ensure the creepage distance for insulation equal to or greater than a creepage distance along the end faces of the mats 5a, 5b between the case 4 and the inner pipe 6, even if the end face of the upstream side mat 5a or the downstream side mat 5b between the case 4 and the inner pipe 6 is covered with particulate matter.

Accordingly, according to the construction of the upstream side and downstream side mats 5a, 5b according to this embodiment, it is possible to suppress a short circuit between the catalyst carrier 3 and the case 4 by the particulate matter at a higher probability.

Here, note that the construction of the mat 5 as in this embodiment can also be applied in cases where only the upstream side inner pipe heater for heating the upstream side protrusion portion 6a of the inner pipe 6 is provided, as in the first embodiment.

DESCRIPTION OF THE REFERENCE SIGNS

1 . . . electric heating catalyst (EHC)
2 . . . exhaust pipe
3 . . . catalyst carrier
4 . . . case
5 . . . mat
6 . . . inner pipe
6a, 6b . . . protrusion portions
7 . . . electrodes
10 . . . inner pipe heater
10a . . . upstream side inner pipe heater
10b . . . downstream side inner pipe heater
11 . . . electric supply control unit
20 . . . ECU
21 . . . temperature sensor

The invention claimed is:

1. An electric heating catalyst comprising:
a heat generation element that is electrically energized to generate heat so that a catalyst is heated by the generation of heat;
a case that receives said heat generation element therein;
an insulating support member that is arranged between said heat generation element and said case for supporting said heat generation element and insulating electricity;
an inner pipe that is a tubular member which is inserted into said insulating support member so as to be located between said heat generation element and said case, wherein said inner pipe has an end thereof protruding into an exhaust gas from an end face of said insulating support member, and said inner pipe has an electrically insulating layer formed on an entire surface thereof, or said inner pipe is formed of an electrically insulating material; and
an inner pipe heater that is supplied with electricity through a path which is different from a path through which electricity is supplied to said heat generation element, thereby to heat a protrusion portion in said inner pipe which protrudes into the exhaust gas from the end face of said insulating support member.

2. The electric heating catalyst as set forth in claim 1, wherein
said inner pipe protrudes into the exhaust gas from both upstream side and downstream side end faces of said insulating support member; and
a heater control unit is further provided that heats, among the upstream side and downstream side protrusion portions of said inner pipe, at least the upstream side protrusion portion by means of said inner pipe heater, in cases where a condition in which the temperature of the exhaust gas flowing into the electric heating catalyst from the upstream side thereof falls is satisfied, or in cases where the temperature of the exhaust gas becomes equal to or lower than a predetermined temperature.

3. The electric heating catalyst as set forth in claim 2, wherein
in cases where the condition in which the temperature of the exhaust gas flowing into the electric heating catalyst from the upstream side thereof falls is satisfied, or in cases where the temperature of the exhaust gas becomes equal to or lower than a predetermined temperature, said heater control unit makes an amount of heating to be supplied to the upstream side protrusion portion of said inner pipe by said inner pipe heater larger than an amount of heating to be supplied to the downstream side protrusion portion of said inner pipe by said inner pipe heater.

4. The electric heating catalyst as set forth in claim 2, wherein
in cases where the condition in which the temperature of the exhaust gas flowing into the electric heating catalyst from the upstream side thereof falls is satisfied, or in cases where the temperature of the exhaust gas becomes equal to or lower than a predetermined temperature, said heater control unit first starts heating of the upstream side protrusion portion of said inner pipe, and then starts heating of the downstream side protrusion portion of said inner pipe, by means of said inner pipe heater.

5. The electric heating catalyst as set forth in claim 4, wherein
said heater control unit controls such that the higher the temperature of the electric heating catalyst, the longer a period of time from the start of heating of the upstream side protrusion portion of said inner pipe until the start of heating of the downstream side protrusion portion of said inner pipe is made.

6. The electric heating catalyst as set forth in claim 1, wherein
an end face of said insulating support member between said case and said inner pipe is dented inward from an end face of said heat generation element, and an amount of dent of the end face of said insulating support member is larger than a spatial distance between said case and said inner pipe.

\* \* \* \* \*